United States Patent
Mochida et al.

(10) Patent No.: US 8,405,255 B2
(45) Date of Patent: Mar. 26, 2013

(54) ELECTRIC POWER GENERATING APPARATUS

(75) Inventors: Takashi Mochida, Chiba (JP); Takeshi Ozawa, Chiba (JP); Sachiko Kaneko, Chiba (JP)

(73) Assignee: Sony Corporation, Tokyo (JP)

( * ) Notice: Subject to any disclaimer, the term of this patent is extended or adjusted under 35 U.S.C. 154(b) by 538 days.

(21) Appl. No.: 12/615,396

(22) Filed: Nov. 10, 2009

(65) Prior Publication Data

US 2010/0117373 A1  May 13, 2010

(30) Foreign Application Priority Data

Nov. 10, 2008 (JP) ................ 2008-287572

(51) Int. Cl.
*H02K 35/02* (2006.01)
(52) U.S. Cl. .......................... 310/15; 310/20
(58) Field of Classification Search ........... 310/15, 310/20, 27, 30; 290/1 A
See application file for complete search history.

(56) References Cited

U.S. PATENT DOCUMENTS

| | | | | |
|---|---|---|---|---|
| 3,259,769 A * | 7/1966 | Stott | ................. | 310/14 |
| 4,697,113 A * | 9/1987 | Young | ................. | 310/15 |
| 7,229,188 B2 * | 6/2007 | Mah | ................. | 362/192 |
| 2008/0265692 A1* | 10/2008 | Roberts | ................. | 310/15 |

\* cited by examiner

*Primary Examiner* — Hanh Nguyen
*Assistant Examiner* — Naishadh Desai
(74) *Attorney, Agent, or Firm* — Wolf, Greenfield & Sacks, P.C.

(57) ABSTRACT

Disclosed is an electric power generating apparatus. The electric power generating apparatus includes a casing that is made of a nonmagnetic material and has an outer surface and an interior space, a guide shaft that is made of a nonmagnetic material and provided in the interior space while being supported by the casing, a permanent magnet provided to the guide shaft so that the permanent magnet is capable of being reciprocated, a coil provided on an outer circumference of the interior space, a shield case to cover the outer surface of the casing, the shield case being made of a magnetic material, and an electric circuit unit to output an electric energy generated in the coil by reciprocating the permanent magnet.

18 Claims, 11 Drawing Sheets

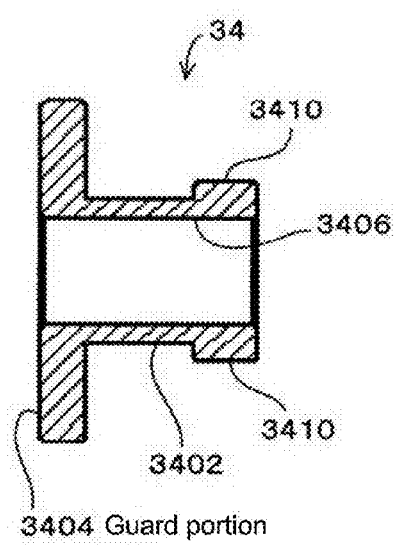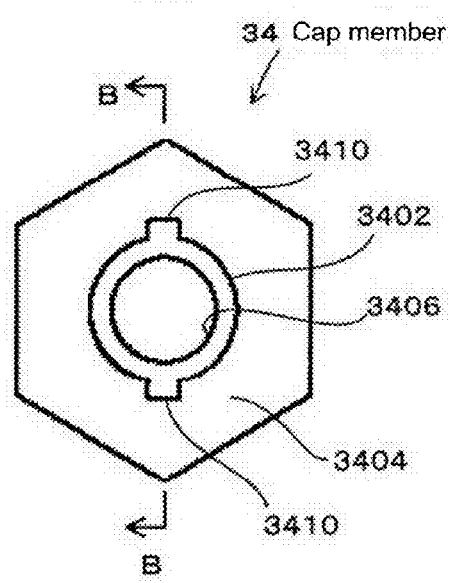

ELECTRIC POWER GENERATING APPARATUS

BACKGROUND OF THE INVENTION

1. Field of the Invention

The present invention relates to an electric power generating apparatus for manually performing an operation of generating electric power.

2. Description of the Related Art

There have been provided portable electric apparatuses such as a portable music player, a mobile phone, a flashlight, and a portable game machine, which include as a power source an electric power generating apparatus that performs electric power generation by a manual operation.

As the electric power generating apparatus described above, there has been proposed an electric power generating apparatus in which a solenoid coil is wound around an outer circumference of a nonmagnetic tube-like case and a permanent magnet is reciprocated in the tube-like case, thereby generating electric power based on the Faraday's law (see, Japanese Patent Application Laid-open Nos. HEI 10-174411, 2002-374661, 2002-281727, 2005-33917, and 2006-296144).

Further, there has been also proposed an electric power generating apparatus in which a guide member that guides a permanent magnet in a longitudinal direction of a tube-like case is provided (see, Japanese Patent Application Laid-open No. 2005-94832).

SUMMARY OF THE INVENTION

However, in the electric power generating apparatus in related art as described above, a magnetic flux of the permanent magnet disposed in the nonmagnetic tube-like case leaks outside the case. When there is, for example, a magnetic card or the like, a watch, or a CRT-based television near the electric power generating apparatus, the leakage may adversely affect those items.

In addition, because the magnetic flux of the permanent magnet leaks outside the case, in a case where there is another magnetic body near the case, the magnetic body and a leakage field from the case affect each other, with the result that the reciprocation of the permanent magnet may be hindered.

In another situation, because the magnetic flux of the permanent magnet leaks outside the case, in a case where a plurality of electric power generating apparatuses are aligned, leakage magnetic fluxes cause a repulsive force or an attractive force to act, with the result that the reciprocation of the permanent magnet may be hindered.

The present invention has been made in view of the above-mentioned circumstances, and it is desirable to provide an electric power generating apparatus that is advantageous for preventing the leakage of the magnetic flux to the outside while securing electric power generation efficiency and preventing itself from being affected by an external magnetic field.

According to an embodiment of the present invention, there is provided an electric power generating apparatus including a casing, a guide shaft, a permanent magnet, a coil, a shield case, and an electric circuit unit. The casing is made of a nonmagnetic material and has an outer surface and an interior space. The guide shaft is made of a nonmagnetic material and provided in the interior space while being supported by the casing. The permanent magnet is provided to the guide shaft so that the permanent magnet is capable of being reciprocated. The coil is provided on an outer circumference of the interior space. The shield case covers an outer surface of the casing and is made of a magnetic material. The electric circuit unit outputs an electric energy generated in the coil by reciprocating the permanent magnet.

According to the embodiment of the present invention, the casing is covered with the shield case, with the result that the magnetic flux of the permanent magnet is prevented from leaking to the outside of the casing.

Thus, even in a case where there is, for example, a magnetic card or the like, a watch, or a CRT-based television near the electric power generating apparatus, those items are prevented from being adversely affected.

Further, even in a case where another magnetic body is disposed near the casing, the reciprocation of the permanent magnet is prevented from being hindered, which is advantageous for ensuring a stable operation of generating electric power.

In addition, even in a case where a plurality of electric power generating apparatuses are aligned, the reciprocation of the permanent magnet is prevented from being hindered, which is advantageous for ensuring a stable operation of generating electric power.

These and other objects, features and advantages of the present invention will become more apparent in light of the following detailed description of best mode embodiments thereof, as illustrated in the accompanying drawings.

BRIEF DESCRIPTION OF DRAWINGS

FIG. 4A is a front view of a cap member, and FIG. 4B is a cross-sectional view of the cap member taken along the line B-B of FIG. 4A;

DESCRIPTION OF PREFERRED EMBODIMENTS

First Embodiment

Embodiments of the present invention will be described with reference to the drawings.

Figure 1:
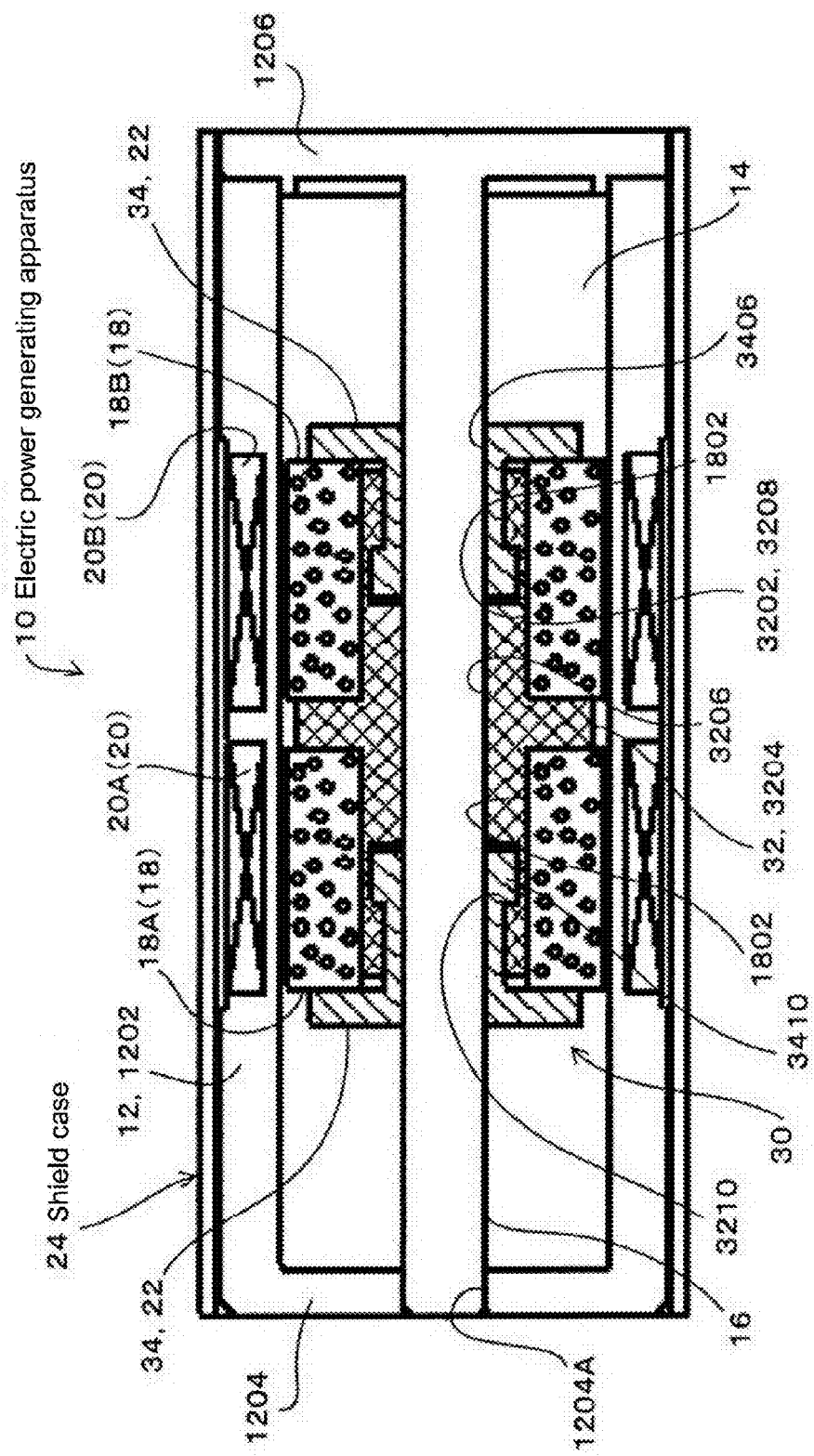
FIG. 1 is a cross-sectional view showing a structure of an electric power generating apparatus according to a first embodiment.
Figure 2:
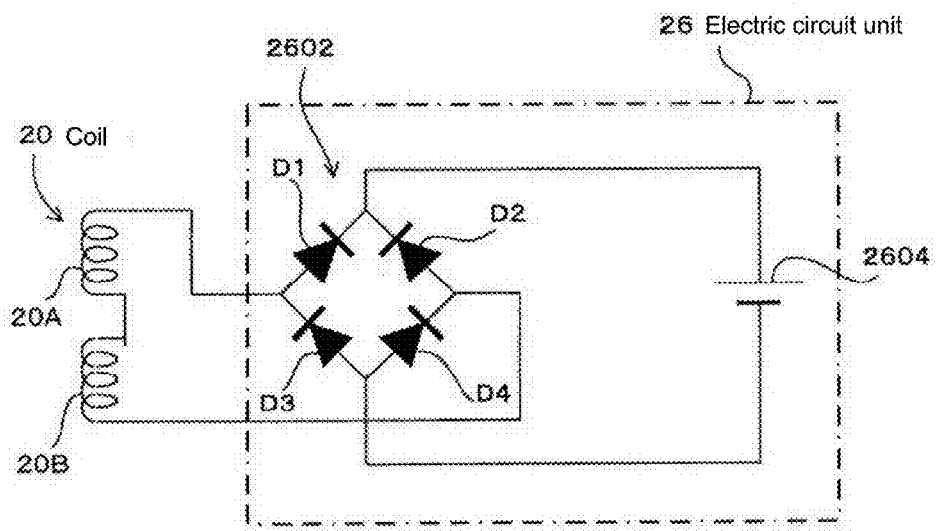
FIG. 2 is a circuit diagram of an electric circuit unit.
Figures 3A, 3B:
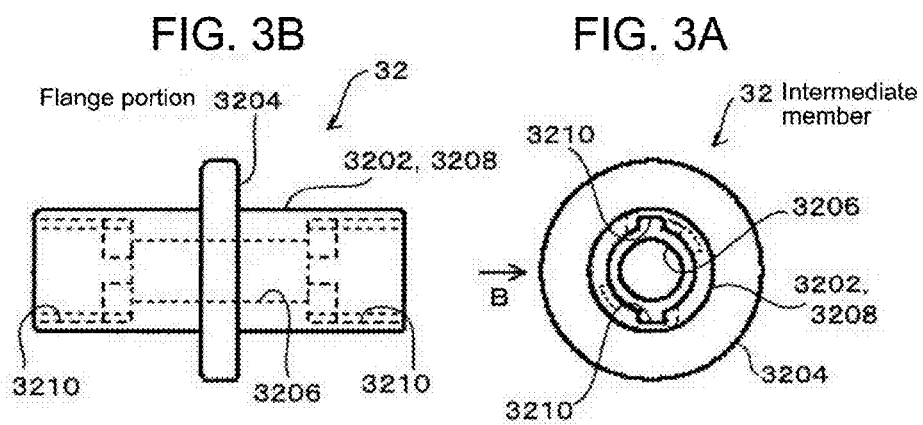
FIG. 3A is a front view of an intermediate member.
FIG. 3B is a side view of the intermediate member viewed from a side thereof in a direction of the arrow B of FIG. 3A.

FIG. 1 is a cross-sectional view showing a structure of an electric power generating apparatus 10 according to this embodiment. FIG. 2 is a circuit diagram of an electric circuit unit 26. FIG. 3A is a front view of an intermediate member 32, and FIG. 3B is a side view of the intermediate member 32 viewed from a side thereof in a direction of the arrow B of FIG. 3A. FIG. 4A is a front view of a cap member 34, and FIG. 4B is a cross-sectional view of the cap member 34 taken along the line B-B of FIG. 4A.

The electric power generating apparatus 10 includes a casing 12, a space portion (interior space) 14, a guide shaft 16, a permanent magnet 18, a coil 20, a buffer member 22, and a shield case 24 that are shown in FIG. 1, and further includes the electric circuit unit 26 shown in FIG. 2.

The casing 12 is made of a nonmagnetic, nonconductive material. In this embodiment, the casing 12 is made of a synthetic resin.

In this embodiment, the casing 12 includes a tube portion 1202, a first end face wall 1204, and a second end face wall 1206. The tube portion 1202 has a circular cross section and has a length longer than an outer diameter thereof. The first end face wall 1204 has a circular shape and blocks one end of the tube portion 1202 in a longitudinal direction, and the second end face wall 1206 has a circular shape and blocks the other end of the tube portion 1202 in the longitudinal direction.

The first end face wall 1204 is integrally formed with the tube portion 1202.

The second end face wall 1206 is integrally formed with the guide shaft 16. The second end face wall 1206 is attached to an opening portion formed at the other end of the tube portion 1202.

The space portion (interior space) 14 is formed in the casing 12. A lateral cross-sectional area of the space portion 14 is larger than a longitudinal cross-sectional area thereof, and the space portion 14 is laterally long. In this embodiment, the space portion 14 has a cylindrical shape.

The guide shaft 16 is supported by the casing 12 and extended in the longitudinal direction of the space portion 14 on a center axis of the space portion 14. In other words, a shaft center of the guide shaft 16 and an axis center of the space portion 14 are coincided with each other.

The guide shaft 16 is made of a nonmagnetic, nonconductive material and formed into a cylindrical shape.

The second end face wall 1206 is integrally formed with an end of the guide shaft 16, and the other end of the guide shaft 16 is inserted through a hole 1204A formed in the center of the first end face wall 1204 and fixed thereto.

It should be noted that the guide shaft 16 is made of a nonmagnetic material, thereby preventing the movement of the permanent magnet 18 from being affected by a mutual magnetic action between the permanent magnet 18 and the guide shaft 16.

In addition, the guide shaft 16 is made of a nonconductive material, thereby further preventing the movement of the permanent magnet 18 from being affected by an eddy current generated in the guide shaft 16 at a time of moving the permanent magnet 18.

It is desirable to make an outer circumferential surface of the guide shaft 16 smooth to have a low friction coefficient so that a bearing portion 28 (described later) is smoothly slid on the guide shaft 16.

The permanent magnet 18 can be reciprocated with respect to the guide shaft 16 and is provided so as not to rattle in a radial direction of the guide shaft 16.

The permanent magnet 18 is constituted of a first permanent magnet 18A and a second permanent magnet 18B in this embodiment.

The first and second permanent magnets 18A and 18B have a hollow circular cylindrical form of the same size and shape, and a hollow 1802 is formed in an inner circumferential portion of each of the first and second permanent magnets 18A and 18B.

To both ends of the first and second permanent magnets 18A and 18B in a longitudinal direction, a north pole and a south pole are provided.

In this embodiment, portions of the first and second permanent magnets 18A and 18B, which are close to a flange 3208 of the intermediate member 32 (described later), are magnetized to the same magnetic pole, that is, the portions close to each other are magnetized to the same magnetic pole.

Outer diameters of the first and second permanent magnets 18A and 18B are set to be smaller than an inner diameter of the tube portion 1202, and thus a slight gap is formed between an outer circumference of the first and second permanent magnets 18A and 18B and an inner circumference of the tube portion 1202. That is, a gap is ensured between the outer circumferential surface of the first and second permanent magnets 18A and 18B and the inner circumferential surface of the casing 12 that forms the space portion 14.

It is desirable that the gap mentioned above is set to be as small as possible in order to ensure magnetic fluxes that crosses the coil 20 from the first and second permanent magnets 18A and 18B and improve the electric power generation efficiency.

The first and second permanent magnets 18A and 18B are held by a holding member 30.

As shown in FIG. 1, the holding member 30 holds the first and second permanent magnets 18A and 18B and includes the intermediate member 32 and the cap member 34.

The intermediate member 32 and the cap member 34 are each formed of a nonmagnetic material.

The intermediate member 32 and the cap member 34 are each formed of the nonmagnetic material, thereby preventing the magnetic flux toward the coil 20 from the permanent magnet 18 from being affected.

As shown in FIG. 1 and FIGS. 3A and 3B, the intermediate member 32 includes a tube portion 3202 and a flange portion 3204.

The tube portion 3202 has a circular tube shape. In an inner circumferential portion of the tube portion 3202, a hole 3206 through which the guide shaft 16 is inserted is formed, and in an outer circumferential portion thereof, an outer circumferential surface 3208 to which the permanent magnet 18 is attached is formed.

The flange portion 3204 is provided so as to protrude from a longitudinal intermediate portion of the outer circumferential surface 3208.

At both ends of the intermediate member 32 in a length direction thereof, engagement grooves 3210 are formed.

The engagement grooves 3210 include opening portions, linear portions, and arc portions. The opening portions are opened on the end surfaces of the intermediate member 32 in the length direction. The linear portions are extended from the opening portions in the length direction of the intermediate member 32. The arc portions are extended in a circumferential direction at the ends of the linear portions.

In the engagement grooves 3210, engagement protrusions 3410 (FIGS. 4A and 4B) of the cap member 34 are inserted from the opening portions into the linear portions. Subsequently, the cap member 34 is rotated, thereby inserting the engagement protrusions 3410 into the arc portions, with the result that the cap member 34 is attached to the intermediate member 32 so as not to fall off.

As shown in FIG. 1 and FIGS. 4A and 4B, the cap member 34 includes a tube portion 3402 and a guard portion 3404.

The tube portion 3402 has a circular tube shape. In the tube portion 3402, a hole 3406 through which the guide shaft 16 is inserted is formed. The engagement protrusions 3410 are formed at an end of the tube portion 3402.

In this embodiment, at least one of the hole 3206 of the intermediate member 32 and the hole 3406 of the cap member 34 is slidably connected with the guide shaft 16.

The guard portion 3404 is protruded from the longitudinal end of the tube portion 3402, which is opposed to the engagement protrusions 3410, and holds the permanent magnet 18 attached to the outer circumferential surface 3208 in cooperation with the flange portion 3204.

In this embodiment, the guard portion 3404 has a shape of regular hexagon, which facilitates an operation of attaching the cap member 34 to the intermediate member 32.

As shown in FIG. 1, the buffer member 22 absorbs an impact caused by a collision of the permanent magnet 18 with the casing 12 in the longitudinal direction of the guide shaft 16 when the first and second permanent magnets 18A and 18B held by the holding member 30 are reciprocated along the guide shaft 16.

In this embodiment, the buffer member 22 is constituted of the guard portions 3404 of two cap members 34.

Note that it is desirable that the cap member 34 is made of a material whose friction coefficient is low in order to smoothly slide with respect to the guide shaft 16. In addition, in a case where the hole 3206 of the intermediate member 32 is connected to the guide shaft 16, it is desirable that the intermediate member 32 is made of a material whose friction coefficient is low in order to smoothly slide with respect to the guide shaft 16.

Further, it is desirable that the cap member 34 is made of a material having an excellent impact resistance in order to absorb and alleviate the impact when colliding with the first and second end face walls 1204 and 1206 of the casing 12.

For the material of the cap member 34, various synthetic resin materials publicly known may be used.

As shown in FIG. 1, the coil 20 is disposed on an outer circumference of the space portion 14 in the longitudinal direction of the space portion 14, and the permanent magnet 18 passes through the inside of the coil 20.

In this embodiment, the coil 20 is formed by serially connecting a first coil 20A and a second coil 20B with each other.

The first and second coils 20A and 20B are disposed at positions on an outer circumferential surface of the casing 12, which sandwich the longitudinal center of the tube portion 1202 of the casing 12 and are separated by the same distance from the longitudinal center.

The shield case 24 is made of a magnetic material and covers an outer surface of the casing 12. As the magnetic material, a material obtained by performing sheet-metal processing on a plate material such as a cold-rolled steel (SPC material) may be arbitrarily used.

The thicker the shield case 24, the less the magnetic flux leaks. It is desirable to set the thickness of the shield case 24 within a range of 0.2 mm to 0.8 mm for reducing the cost while effectively preventing the flux leakage.

In this embodiment, the shield case 24 is formed into a circular tube shape so that the shield case 24 entirely covers the tube portion 1202 excluding the first and second end face walls 1204 and 1206 in the outer surface of the casing 12.

In addition, in this embodiment, the permanent magnet 18 is disposed midway between the axis center of the space portion 14 and the shield case 24 in the radial direction of the guide shaft 16.

With this structure, it is possible to balance the magnetic attractive force in the radial direction of the guide shaft 16, which acts between the permanent magnet 18 and the shield case 24. Therefore, the friction force that acts between the guide shaft 16 and the holding member 30 can be reduced, which is advantageous for improving the electric power generation efficiency.

Further, the shield case 24 is disposed on the same axis center as the permanent magnet 18.

This structure is advantageous for maintaining a balance of the magnetic attractive force in the radial direction of the guide shaft 16 which acts between the permanent magnet 18 and the shield case 24, and is advantageous for facilitating and stabilizing the movement of the permanent magnet 18 along the guide shaft 16.

As shown in FIG. 2, the electric circuit unit 26 outputs en electric energy generated in the coil 20 by the reciprocation of the permanent magnet 18.

The electric circuit unit 26 may be incorporated in the casing 12 or may be formed separately from the casing 12.

In this embodiment, for example, the electric circuit unit 26 includes a rectifier circuit 2602 and an electric charge unit 2604. The rectifier circuit 2602 rectifies a current generated in the coil 20, and the electric charge unit 2604 charges a direct current obtained by the rectifier circuit 2602 and outputs it as a voltage.

Further, the electric charge unit 2604 is connected to a power input terminal of an electronic apparatus in which the power generation apparatus 10 is incorporated, and the electric power from the electric charge unit 2604 is supplied to the electronic apparatus through the power input terminal.

As shown in FIG. 2, for the rectifier circuit 2602, various rectifier circuits publicly known such as a rectifier circuit including four diodes D1 to D4 for rectification can be used.

For the electric charge unit 2604, various secondary batteries or capacitors publicly known can be used.

(Description on Assembling Operation)

Next, a description will be given on assembly of the electric power generating apparatus 10.

In advance, the first and second coils 20A and 20B are provided to the tube portion 1202 of the casing 12, and the shield case 24 is attached on the outer circumferential surface of the tube portion 1202.

In addition, the electric circuit unit 26 is electrically connected with the first and second coils 20A and 20B.

The first and second permanent magnets 18A and 18B are provided to the holding member 30.

That is, the intermediate member 32 is provided with the first and second permanent magnets 18A and 18B, and thereafter provided with the cap member 34.

In this case, the portions at which the first and second permanent magnets 18A and 18B are close to the flange 3208 of the intermediate member 32 are magnetized to the same magnetic pole. Therefore, a repulsive force acts between the first and second permanent magnets 18A and 18B.

The repulsive force pushes the engagement protrusions 3410 against the arc portions of the engagement grooves 3210, with the result that the cap member 34 is reliably held without falling off from the intermediate member 32.

As described above, when the first and second permanent magnets 18A and 18B are provided to the holding member 30, the guide shaft 16 is inserted through the hole 3206 of the intermediate member 32 and the hole 3406 of the cap member 34.

Subsequently, the end of the guide shaft 16 is inserted through the hole 1204A of the first end face wall 1204, and the second end face wall 1206 is attached and fixed to the opening portion of the tube portion 1202.

In this way, the assembling operation of the electric power generating apparatus 10 is completed.

(Usage)

Next, a description will be given on how to use the electric power generating apparatus 10.

In advance, it is supposed that the electric power generating apparatus 10 according to this embodiment is incorporated in a portable electronic apparatus such as a portable music player, a mobile phone, a flashlight, and a portable game machine.

In using the electronic apparatus, the user grabs the electronic apparatus and reciprocates the electronic apparatus with the user's arm in the longitudinal direction of the casing 12 of the electric power generating apparatus 10.

The reciprocation of the electronic apparatus causes the permanent magnet 18 to reciprocate in the coil 20, an alternating current generated in the coil 20 is changed into a direct current by the electric circuit unit 26, and the direct current is supplied to the electronic apparatus, thereby causing the electronic apparatus to operate.

According to this embodiment, the shield case 24 covers the outer surface of the casing 12, and therefore the magnetic flux of the permanent magnet 18 is prevented from leaking to the outside of the casing 12.

Accordingly, even in a case where there is, for example, a magnetic card or the like, a watch, or a CRT-based television near the electric power generating apparatus 10, those items are prevented from being adversely affected.

In addition, even in a case where another magnetic body is disposed near the casing 12, the reciprocation of the permanent magnet 18 is prevented from being hindered because the shield case 24 prevents the permanent magnet 18 from being affected by the leakage magnetic field from the other magnetic body, which is advantageous for ensuring a stable operation of generating electric power.

Further, even in a case where a plurality of electric power generating apparatuses 10 are aligned, because the shield case 24 prevents the leakage magnetic fluxes of the electric power generating apparatuses from affecting each other, the repulsive force or attractive force does not act and the reciprocation of the permanent magnet 18 is prevented from being hindered, which is advantageous for ensuring a stable operation of generating electric power.

Furthermore, the shield case 24 also functions as a yoke that guides the magnetic flux generated from the permanent magnet 18, and therefore the magnetic flux efficiently crosses the coil 20, which is advantageous for ensuring the electric power generation efficiency.

Accordingly, it is advantageous for preventing the leakage of the magnetic flux to the outside and preventing an influence from an external magnetic field while ensuring the electric power generation efficiency.

In addition, in this embodiment, portions close to the flange 3204 of the intermediate member 32 in the first and second permanent magnets 18A and 18B held by the holding member 30 are magnetized to the same magnetic pole.

Thus, in the magnetic fluxes generated from the magnetic poles, the amount of components that linearly extend is increased toward the outside of the radial direction of the coil 20 from the inside of the coil 20.

In other words, the amount of components is increased along a plane that is perpendicular to the center axis of the coil 20. Therefore, the magnetic flux efficiently crosses the coil 20, which is more advantageous for ensuring the electric power generation efficiency.

Second Embodiment

Next, a description will be given on a second embodiment.

The second embodiment is different from the first embodiment in that the shield case 40 covers an entire area of two end surfaces disposed at the both ends in the longitudinal direction, in addition to the entire area of the circumferential surface of the outer surface of the casing 12, that is, the shield case 40 covers the entire surface of the casing 12.

Figure 5:
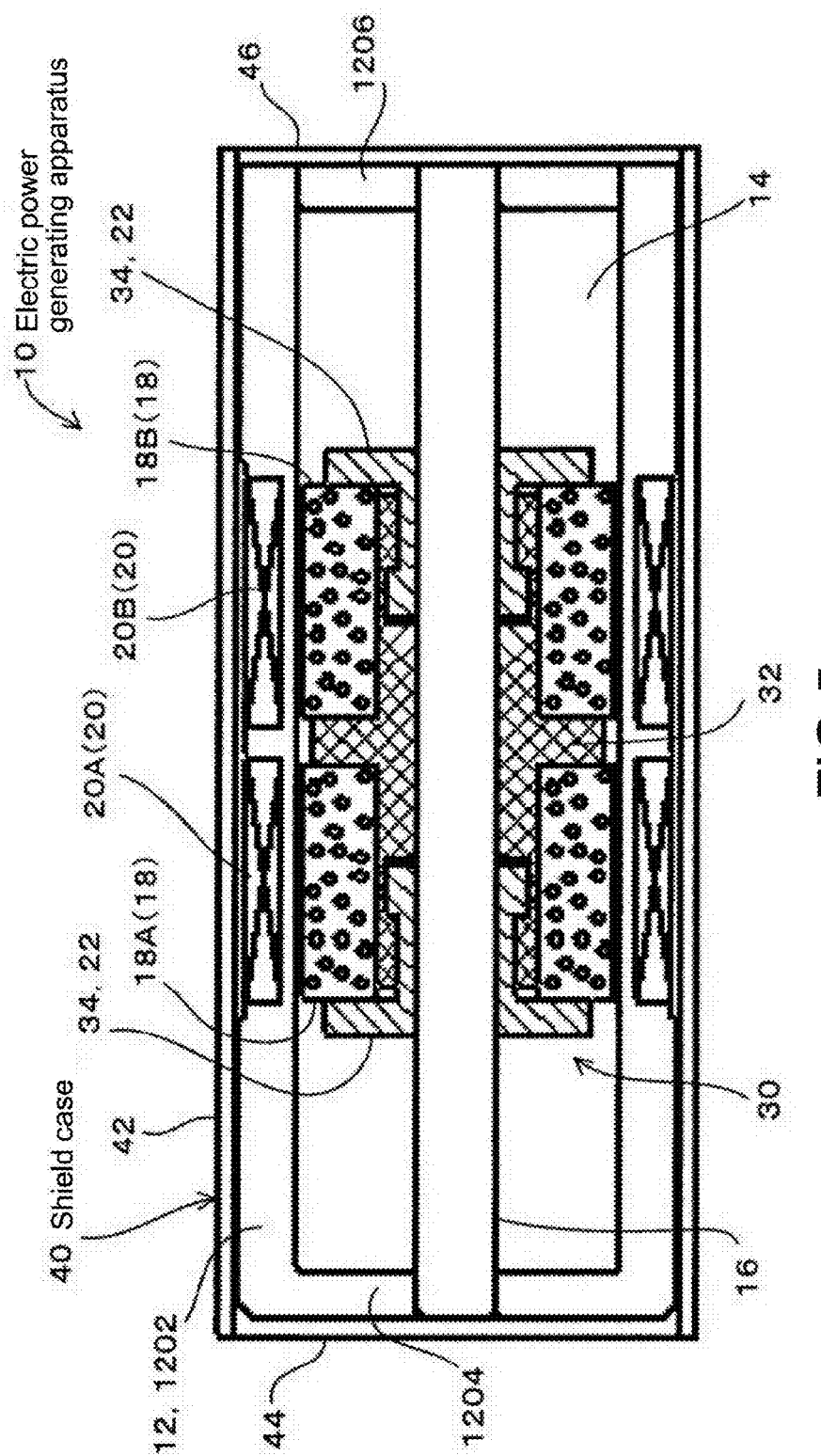
FIG. 5 is a cross-sectional view of an electric power generating apparatus according to a second embodiment.
Figure 6:
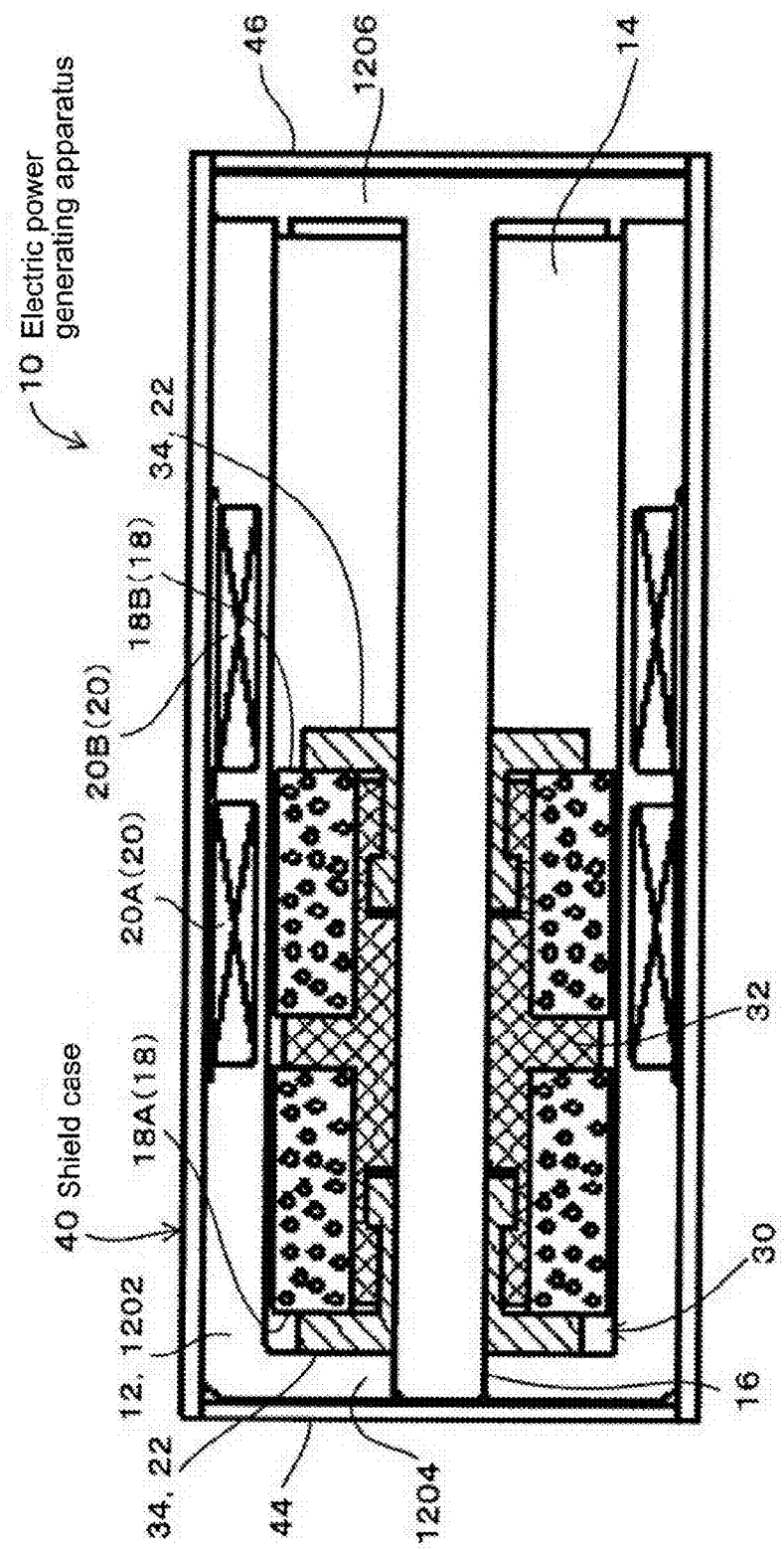
FIG. 6 is an operation explanatory diagram of the electric power generating apparatus according to the second embodiment.

FIG. 5 is a cross-sectional view of the electric power generating apparatus 10 according to the second embodiment, and FIG. 6 is an operation explanatory diagram of the electric power generating apparatus 10 according to the second embodiment.

It should be noted that in the second embodiment and subsequent ones, components that are similar to or the same as those of the first embodiment are denoted by the same reference numerals or symbols, and their descriptions will be omitted.

As shown in FIG. 5, the shield case 40 includes first, second, and third shield case portions 42, 44, and 46.

The first shield case portion 42 covers an entire area of the tube portion 1202 excluding the first and second end face walls 1204 and 1206 in the outer surface of the casing 12.

The second and third shield case portion 44 and 46 cover the first and second end face walls 1204 and 1206, respectively.

According to the second embodiment, when the electric power generating apparatus 10 is reciprocated in the longitudinal direction of the casing 12 and a force larger than the attractive force acts on the permanent magnet 18 held by the holding member 30, the electric generating operation that is the same as the first embodiment is performed.

In addition, according to the second embodiment, it is possible to prevent leakage of the magnetic flux toward the outside of the casing 12 from the first and second end face walls 1204 and 1206 and leakage of the magnetic flux toward the inside of the casing 12 from the first and second end face walls 1204 and 1206. As a result, the second embodiment is more advantageous for preventing the adverse effect by the leakage magnetic flux as compared to the first embodiment.

Further, according to the second embodiment, as shown in FIG. 6, at a first limit position at which the first permanent magnet 18A comes closest to the first end face wall 1204, the permanent magnet 18 is held by the magnetic attractive force that acts between the first permanent magnet 18A and the second shield case 44.

More specifically, the permanent magnet 18 is held at the first limit position at which the buffer member 22 is contacted with the first end face wall 1204.

In addition, at a second limit position at which the second permanent magnet 18B comes closest to the second end face wall 1206, the permanent magnet 18 is held by the magnetic attractive force that acts between the second permanent magnet 18B and the third shield case 46.

More specifically, the permanent magnet 18 is held at the second limit position at which the buffer member 22 is contacted with the second end face wall 1206.

That is, because the permanent magnet 18 is held at the first and second limit positions by the magnetic attractive force, when the electric power generating apparatus is carried, it is possible to prevent the permanent magnet 18 from unnecessarily moving and thus prevent uncomfortable vibrations or noises, which is advantageous for improving the usability of the electric power generating apparatus.

It should be noted that degrees of the magnetic attractive forces that act between the second shield portion 44 and the permanent magnet 18 and between the third shield portion 46 and the permanent magnet 18 may be adjusted so that the permanent magnet 18 does not move when the user carries the electric power generating apparatus 10.

In addition, it is possible to easily adjust the degrees of the magnetic attractive forces that act between the second shield portion 44 and the permanent magnet 18 and between the third shield portion 46 and the permanent magnet 18 by adjusting the thickness of the buffer member 22 intervened between the second shield portion 44 and the permanent magnet 18 and between the third shield portion 46 and the permanent magnet 18, for example.

Third Embodiment

Next, a description will be given on a third embodiment.

In the third embodiment, the outline of the electric power generating apparatus 10 is set to be the same as the outline of a casing of a commercially available primary battery or secondary battery.

Figure 7:
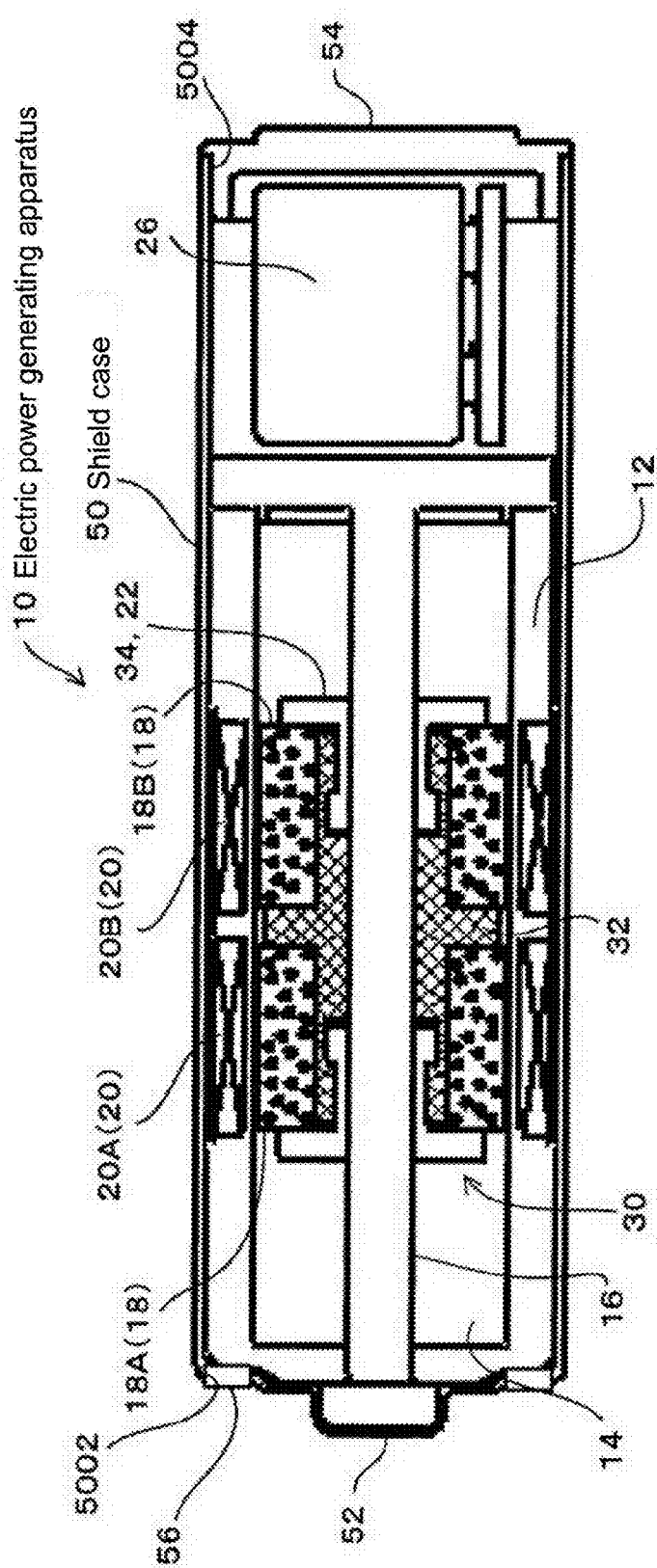
FIG. 7 is a cross-sectional view of an electric power generating apparatus according to a third embodiment.
Figure 8:
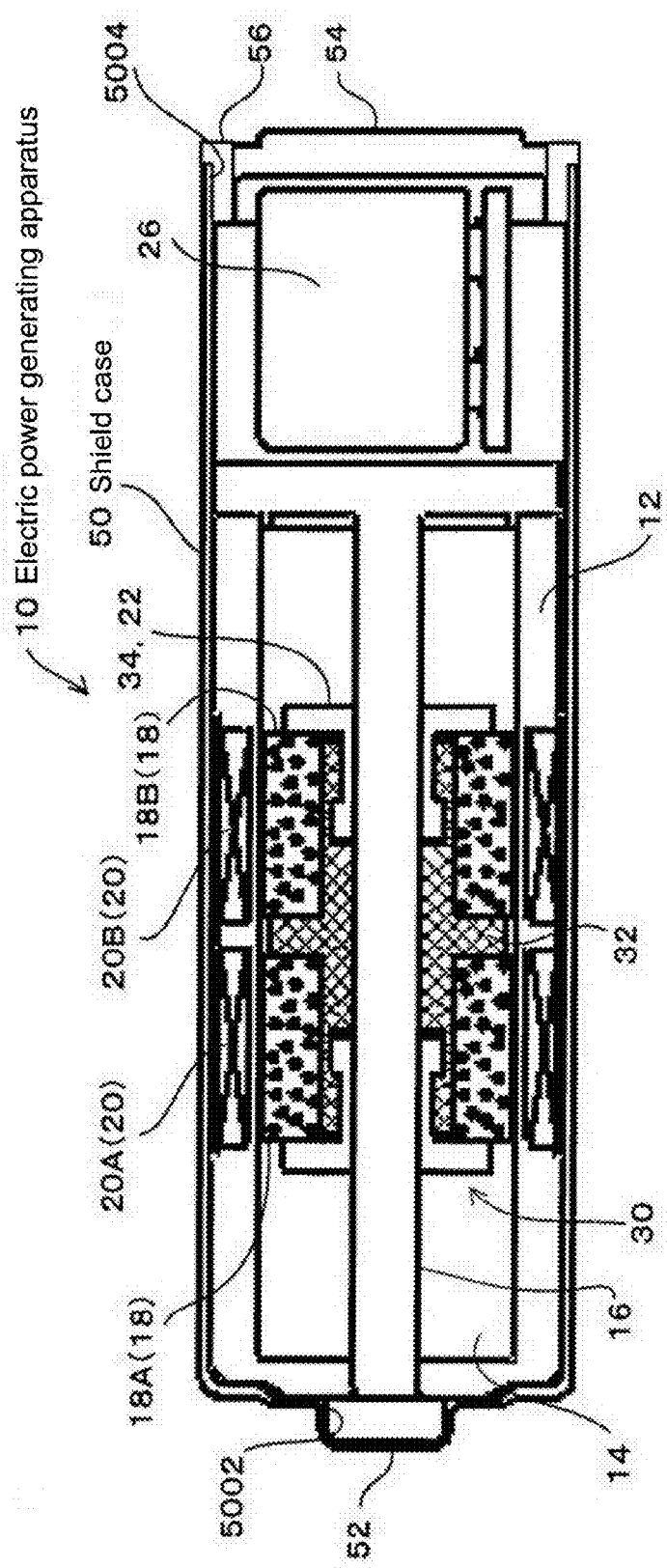
FIG. 8 is a cross-sectional view of a modified example of the electric power generating apparatus according to a third embodiment.

FIGS. 7 and 8 are cross-sectional views of the electric power generating apparatus 10 according to the third embodiment.

As shown in FIG. 7, as in the first embodiment, the electric power generating apparatus 10 includes the casing 12, the space portion 14, the guide shaft 16, the permanent magnet 18, the coil 20, the buffer member 22, a shield case 50, and the electric circuit unit 26.

The electric power generating apparatus 10 has the same shape as the outline of the commercially available primary battery or secondary battery.

A positive-electrode terminal portion 52 and a negative-electrode terminal portion 54 are provided in the same shape at the same position as a positive-electrode terminal portion and a negative-electrode terminal portion of the commercially available primary battery or secondary battery, respectively.

In this embodiment, the electric power generating apparatus 10 has the same shape as the outline of a commercially available AA battery.

The electric circuit unit 26 outputs an electric energy through the positive-electrode terminal portion 52 and the negative-electrode terminal portion 54.

More specifically, the shield case 50 forms the exterior of the electric power generating apparatus 10, and the electric circuit unit 26 and the casing 12 are stored in the shield case 50.

The positive-electrode terminal portion 52 is exposed to the outside of the shield case 50 from an opening portion 5002 formed at a longitudinal end of the shield case 50.

The negative-electrode terminal portion 54 is exposed to the outside of the shield case 50 from an opening portion 5004 formed at the other longitudinal end of the shield case 50.

As shown in FIG. 7, between a part of the shield case 50 which rims the opening portion 5002 and the positive-electrode terminal portion 52, an annular insulating member 56 is provided.

Alternatively, as shown in FIG. 8, between a part of the shield case 50 which rims the opening portion 5004 and the negative-electrode terminal portion 54, the annular insulating member 56 is provided.

As described above, by electrically insulating the shield case 50 from at least one of the positive-electrode terminal portion 52 and the negative-electrode terminal portion 54 by the insulating member 56, the positive-electrode terminal portion 52 and the negative-electrode terminal portion 54 are prevented from being short-circuited through the shield case 50.

According to the third embodiment, the same effect as the first embodiment can of course be obtained. Further, because the electric power generating apparatus 10 has the same shape as the outline of the casing of the commercially available primary battery or secondary battery, the electronic apparatus can be equipped with the electric power generating apparatus 10 in place of the primary battery or the secondary battery.

As a result, it is possible to provide and use the electric power generating apparatus 10 without reconfiguring the electronic apparatus, which is advantageous for improving the ease of use.

For example, in a case where a remote controller of a television or the like is equipped with the electric power generating apparatus in place of the primary battery in related art, the television can be operated by shaking the remote controller several times.

That is, because the electric power generating apparatus can be mounted on the electronic apparatus that uses the primary battery and can be repeatedly charged and used, it is unnecessary to replace the electric power generating apparatus unlike the primary battery, and it is possible to eliminate the cost of a new battery without doing away with a used primary battery. This is advantageous for making a contribution to preserve the global environment.

Fourth Embodiment

Next, a description will be given on a fourth embodiment.

The fourth embodiment is different from the third embodiment in that an exterior case 60 is provided.

Figure 9:
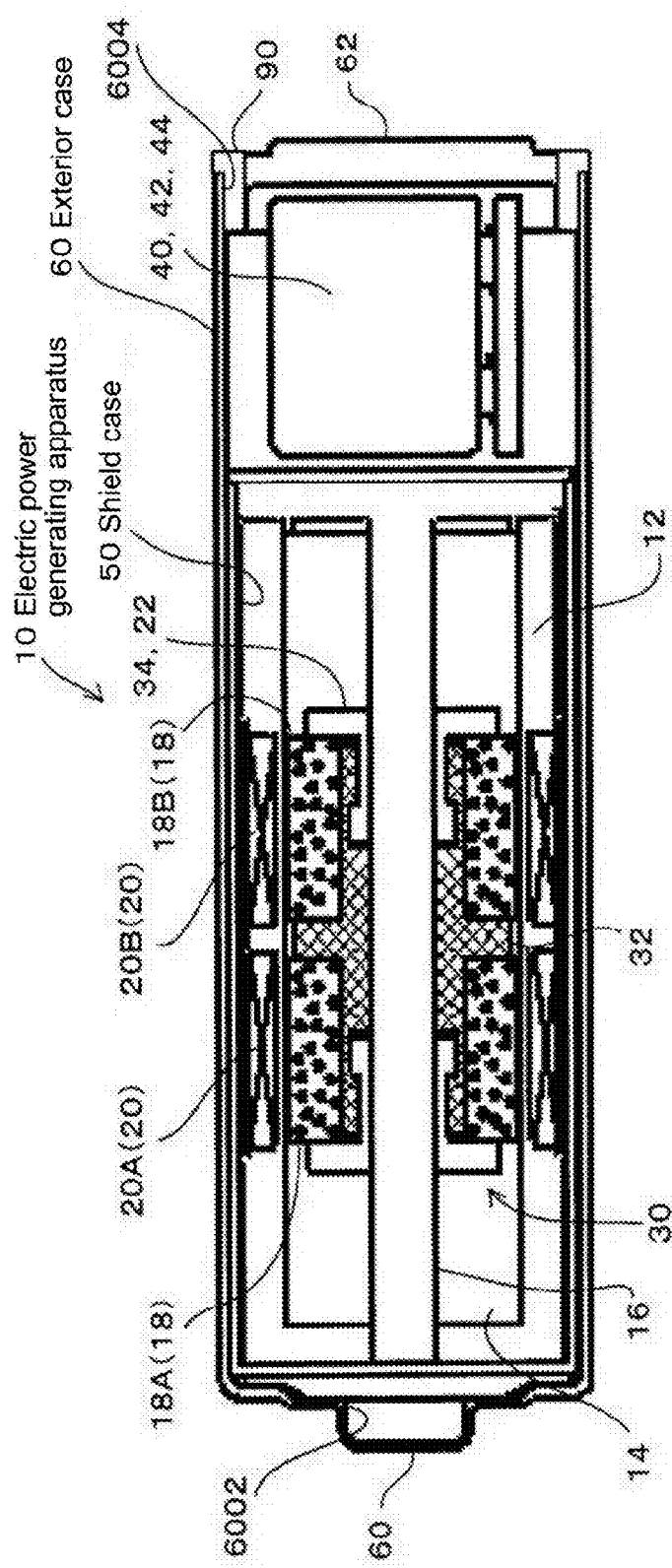
FIG. 9 is a cross-sectional view of an electric power generating apparatus according to a fourth embodiment.

FIG. 9 is a cross-sectional view of the electric power generating apparatus 10 according to the fourth embodiment. Components that are the same as or corresponding to those of the third embodiment will be denoted by the same reference numerals or symbols.

As shown in FIG. 9, the electric power generating apparatus 10 includes the casing 12, the space portion 14, the guide shaft 16, the permanent magnet 18, the coil 20, the buffer member 22, the shield case 50, the insulating member 56, and the electric circuit unit 26 as in the third embodiment, and further includes the exterior case 60.

In the fourth embodiment, the exterior case 60 is partly formed of a conductive material such as metal, and forms the exterior of the electric power generating apparatus 10.

The exterior case 60 stores the shield case 50 and the electric circuit unit 26.

The positive-electrode terminal portion 52 is exposed to the outside of the exterior case 60 from an opening portion 6002 formed at one end of the exterior case 60.

The negative-electrode terminal portion 54 is exposed to the outside of the exterior case 60 from an opening portion 6004 formed at the other end of the exterior case 60.

Between a part of the exterior case 60 which rims the opening portion 6004 and the negative-electrode terminal portion 54, an annular insulating member 62 is provided. It should be noted that between a part of the exterior case 60 which rims the opening portion 6002 and the positive-electrode terminal portion 52, the annular insulating member 62 may be provided.

As described above, by electrically insulating the exterior case 60 from at least one of the positive-electrode terminal portion 52 and the negative-electrode terminal portion 54 by the insulating member 62, the positive-electrode terminal portion 52 and the negative-electrode terminal portion 54 are prevented from being short-circuited through the exterior case 60.

Further, in a case where the exterior case 60 is made of an insulating material, the insulating member 62 can be eliminated.

In a case where the exterior case 60 has electrical conductivity, it is necessary to prevent an external short circuit through the exterior case 60.

Figure 10:
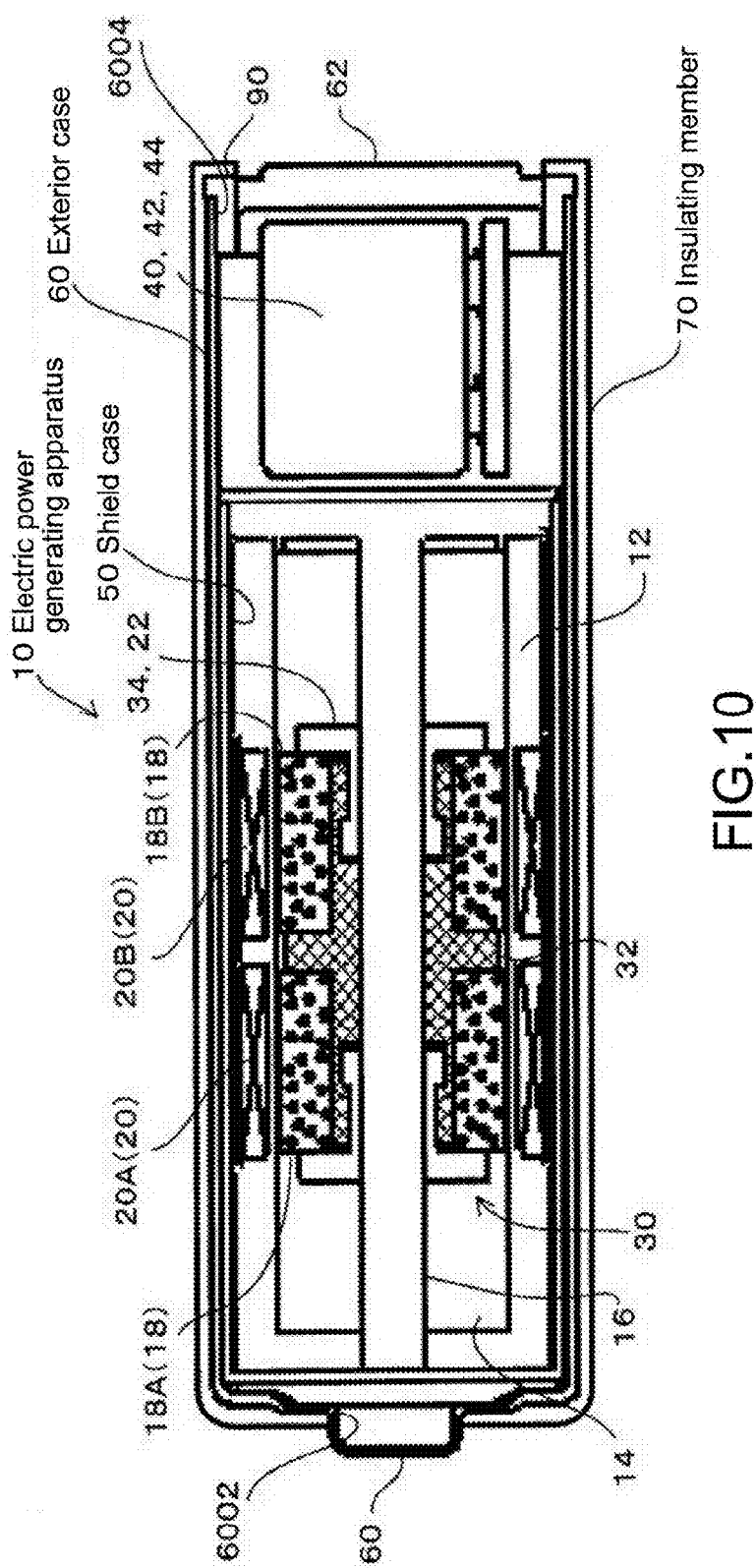
FIG. 10 is a cross-sectional view of a first modified example of the electric power generating apparatus according to the fourth embodiment.

Accordingly, as shown in FIG. 10, like a commercially available alkaline battery or the like, the exterior case 60 may be electrically connected to the positive-electrode terminal portion 52 (or negative-electrode terminal portion 54), and an insulating member 70 that covers an entire area of a part of the exterior case 60 which is exposed to the outside may be provided.

Figure 11:
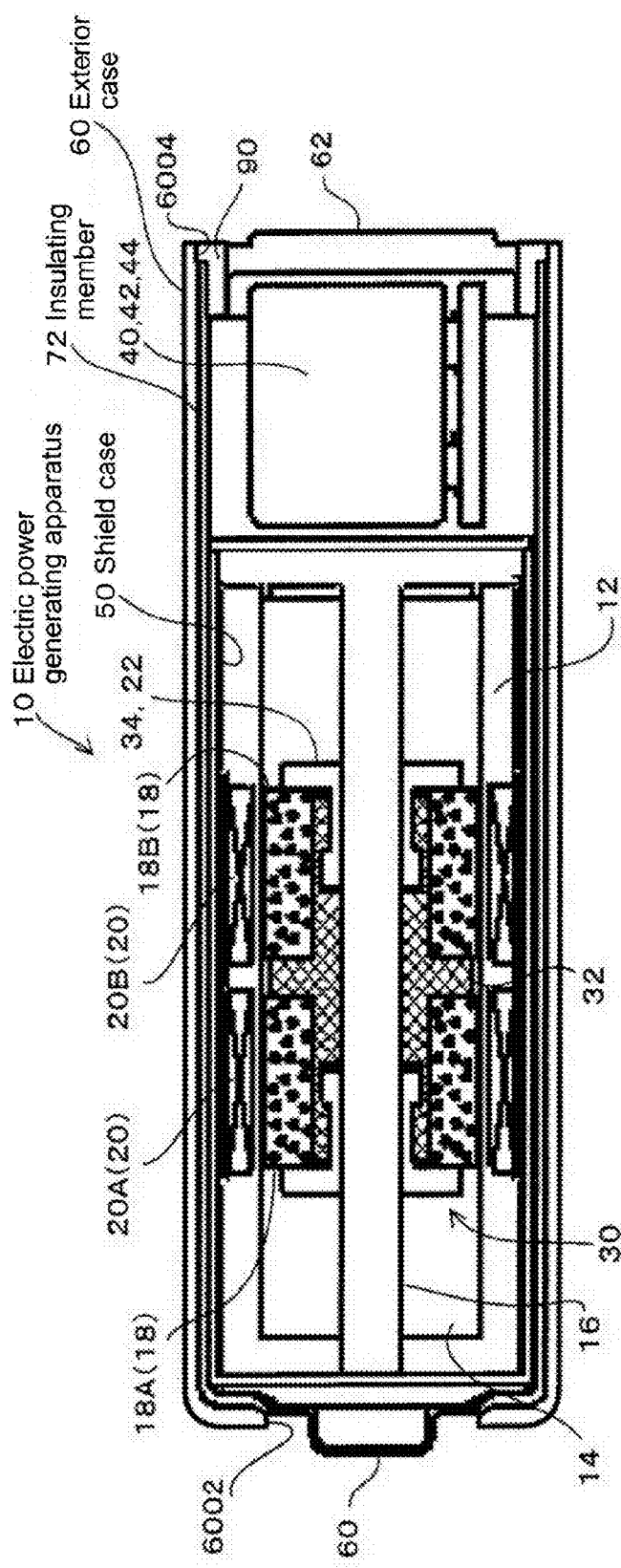
FIG. 11 is a cross-sectional view of a second modified example of the electric power generating apparatus according to the fourth embodiment.

Alternatively, as shown in FIG. 11, like a commercially available manganese battery, an insulating member 72 that covers the entire area of a part of the exterior case 60 which faces the inside and electrically insulates the exterior case 60 from the positive-electrode terminal portion 52 and the negative-electrode terminal portion 54 may be provided.

In this case, an insulating member that covers the entire area of a part of the exterior case 60 which is exposed to the outside may be additionally provided.

Figure 12:
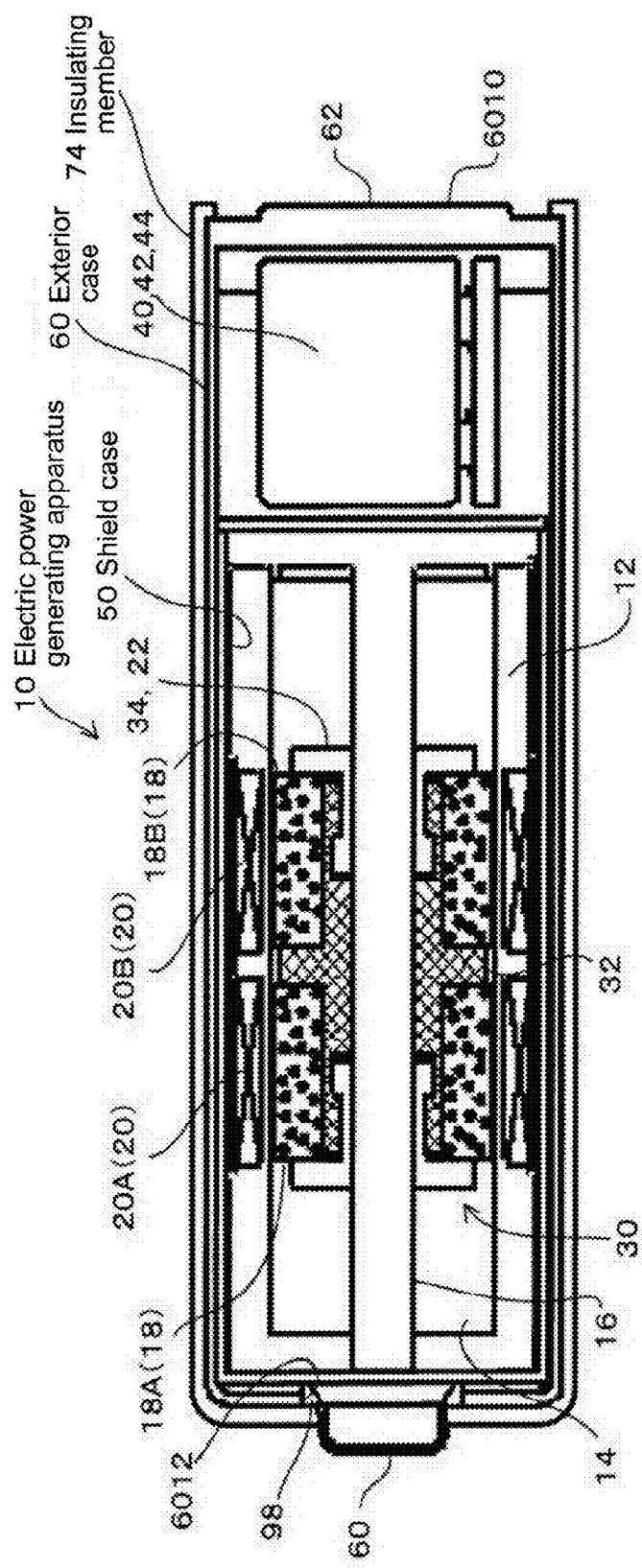
FIG. 12 is a cross-sectional view of a second modified example of the electric power generating apparatus according to the fourth embodiment.

Alternatively, a structure as shown in FIG. 12 may be provided.

Specifically, the exterior case 60 has a bottomed tube shape in which a longitudinal end of the exterior case 60 is blocked by a bottom portion 6010 and an opening portion 6012 is formed on the other end thereof.

One of the positive-electrode terminal portion 52 and the negative-electrode terminal portion 54 is exposed to the outside of the exterior case 60 from the opening portion 6012. In this embodiment, the positive-electrode terminal portion 52 is exposed to the outside of the exterior case 60 from the opening portion 6012.

The other one of the positive-electrode terminal portion 52 and the negative-electrode terminal portion 54 is integrally formed with the bottom portion 6010. In this embodiment, a negative-electrode terminal plate serving as the negative-electrode terminal portion 54 is integrally formed with the bottom portion 6010.

For example, the exterior case 60 is formed by being subjected to a press processing such as deep drawing, thereby forming the other one of the positive-electrode terminal portion 52 and the negative-electrode terminal portion 54 integrally with the bottom portion 6010.

An insulating member 74 that covers at least a part excluding the positive-electrode terminal portion 52 and the negative-electrode terminal portion 54 in the area of the exterior case 60 which is exposed to the outside is provided.

The insulating member 74 may be overlapped with the positive-electrode terminal portion 52 and the negative-electrode terminal portion 54, as long as the positive-electrode terminal portion 52 and the negative-electrode terminal portion 54 function as the electrode terminals.

An annular insulating member 76 is provided between the positive-electrode terminal portion 52 and a part of the exterior case 60 that rims the opening portion 6012, and thus the positive-electrode terminal portion 52 and the exterior case 60 are prevented from being short-circuited.

As the insulating material that forms each of the insulating members 70, 72, and 74 described above, various insulating materials such as an insulating thermal resin (insulating coating resin), an insulating shrinking tube, and an insulating film which are publicly known can be used.

It should be noted that as a method of forming the exterior case, a method in which a deep drawing process and an ironing process are combined can be selected as appropriate. Any methods such as a DI process in which a drawing cap is formed and thereafter the ironing process is applied, a stretch drawing process in which a drawing cap is formed, thereafter stretch bending and unbending process is performed, and the ironing process is applied as necessary, and a multistage drawing process in which the drawing process in multiple stages is performed and thereafter the ironing process is performed may be used.

According to the fourth embodiment, the same effect as in the third embodiment can of course be obtained. Further, the exterior of the electric power generating apparatus 10 is formed of the exterior case 60, which is advantageous for improving durability and appearance of the electric power generating apparatus 10.

In the third and fourth embodiments, the electric power generating apparatus 10 includes the positive-electrode terminal portion 52 and the negative-electrode terminal portion 54 and has the outline that is the same as that of the commercially available primary battery or secondary battery.

In this case, the electric circuit unit 26 outputs the electric energy through the positive-electrode terminal portion 52 and the negative-electrode terminal portion 54.

A detailed description will be given on the outline of the electric power generating apparatus 10. The entire outline thereof may be formed in accordance with the shape and size standard of a battery, which is specified in Japanese Industrial Standards.

That is, the entire outline may be corresponded to the outline of a manganese dry battery or an alkaline dry battery specified in JIS C8501: 2004 (in particular, item numbers 8 to 10) or JIS C8511: 2004 (in particular, item numbers 8 to 10).

It is more particularly desirable to form the outline corresponding to the outline of the manganese dry battery or the alkaline dry battery specified in the appendix table 1 of JIS C8501: 2004 or JIS C8511: 2004. This is because the above-mentioned type battery is widely used as manganese dry batteries or alkaline dry batteries.

It should be noted that, within a range in which a maximum value of the outline size does not exceed the standard, the outline size may be partly smaller than a minimum value of the standard, as long as the outline size mostly falls within the range of the standard.

It should be noted that the number of coils 20 may be one or three or more, although the coil 20 is constituted of the first and second coils 20A and 20B in the above embodiments.

Further, the number of permanent magnets 18 may be one or three or more, although the permanent magnet 18 is constituted of the first and second permanent magnets 18A and 18B in the above embodiments.

Furthermore, although in the above embodiments, the first and second permanent magnets 18A and 18B each have the hollow circular cylindrical form, the first and second permanent magnets 18A and 18B may have any shape as long as the first and second permanent magnets 18A and 18B can be reciprocated along the guide shaft 16.

In addition, in the above embodiments, the engagement protrusion 3410 of the cap member 34 is engaged with the engagement groove 3210 of the intermediate member 32, thereby connecting the intermediate member 32 and the cap member 34.

However, the intermediate member 32 and the cap member 34 may be screwed together and connected to each other by using a male screw and a female screw, or may be bonded to each other by using an adhesive. As a connection structure of the intermediate member 32 and the cap member 34, various connection structures publicly known can be used.

In addition, the structure of the holding member 30 that holds the first and second permanent magnets 18A and 18B is not limited to those described in the above embodiments, and various structures publicly known can be used for the holding member.

The present application contains subject matter related to that disclosed in Japanese Priority Patent Application JP 2008-287572 filed in the Japan Patent Office on Nov. 10, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electric power generating apparatus, comprising:
    a casing that is made of a nonmagnetic material and has an outer surface and an interior space;
    a guide shaft that is made of a nonmagnetic material and provided in the interior space while being supported by the casing;
    a permanent magnet provided to the guide shaft so that the permanent magnet is capable of being reciprocated;
    a coil provided on an outer circumference of the interior space;
    a shield case to cover the outer surface of the casing, the shield case being made of a magnetic material; and
    an electric circuit unit to output an electric energy generated in the coil by reciprocating the permanent magnet;
    wherein the permanent magnet has a hollow cylindrical tube shape and includes two permanent magnets,
    wherein the two permanent magnets are held by a holding member,
    wherein the holding member includes an intermediate member and a cap member,
    wherein the intermediate member includes a tube portion and a flange portion, the tube portion having, on an inner circumferential portion thereof, a hole through which the guide shaft is inserted and having, on an outer circumferential portion thereof, an outer circumferential surface on which the permanent magnet is provided, the flange portion being protruded from a middle portion in a longitudinal direction of the outer circumferential surface,
    wherein the cap member includes a tube portion and a guard portion, the tube portion being provided through both ends of the intermediate member in a longitudinal direction and having a hole through which the guide shaft is inserted, the guard portion being protruded from the tube portion and holding the permanent magnet provided on the outer circumferential surface, and
    wherein at least one of the hole of the intermediate member and the hole of the cap member is slidably connected to the guide shaft.

2. The electric power generating apparatus according to claim 1, wherein the shield case covers an entire area of the outer surface of the casing, excluding both end surfaces in a longitudinal direction.

3. The electric power generating apparatus according to claim 1, wherein the shield case covers an entire surface of the casing.

4. The electric power generating apparatus according to claim 1, wherein the guide shaft and the interior space have center axes that coincide.

5. The electric power generating apparatus according to claim 1, wherein the permanent magnet has an outer circumferential surface, and the casing in which the interior space is formed has an inner circumferential surface, the outer circumferential surface of the permanent magnet and the inner circumferential surface of the casing having a gap therebetween.

6. The electric power generating apparatus according to claim 1, wherein the permanent magnet is disposed midway between a center axes of the interior space and the shield case in a radial direction of the guide shaft.

7. The electric power generating apparatus according to claim 1, further comprising:
    a buffer member to absorb an impact of a collision of the permanent magnet and the casing in a longitudinal direction of the guide shaft.

8. The electric power generating apparatus according to claim 1, wherein the electric power generating apparatus has an outline that is a same as that of one of a primary battery and a secondary battery commercially available and having a positive-electrode terminal portion and a negative-electrode terminal portion,
    wherein the electric circuit unit outputs the electric energy through the positive-electrode terminal portion and the negative-electrode terminal portion.

9. The electric power generating apparatus according to claim 8, wherein the electric power generating apparatus has the outline corresponding to an outline of a dry battery specified in one of JIS C8501 and JIS C8511.

10. The electric power generating apparatus according to claim 8,
    wherein the shield case forms an exterior of the electric power generating apparatus,
    wherein the electric circuit unit is stored in the shield case with the casing, and
    wherein the positive-electrode terminal portion and the negative-electrode terminal portion are exposed to an outside of the shield case from an opening portion formed in the shield case.

11. The electric power generating apparatus according to claim 10, wherein the shield case is electrically insulated from at least one of the positive-electrode terminal portion and the negative-electrode terminal portion by an insulating member.

12. The electric power generating apparatus according to claim 8, further comprising:
    an exterior case to form an exterior of the electric power generating apparatus,
    wherein the shield case and the electric circuit unit are stored in the exterior case, and
    wherein the positive-electrode terminal portion and the negative-electrode terminal portion are exposed to an outside of the exterior case from an opening portion formed in the exterior case.

13. The electric power generating apparatus according to claim 12,
    wherein the exterior case is electrically conductive, and wherein the exterior case is electrically insulated from at least one of the positive-electrode terminal portion and the negative-electrode terminal portion by an insulating member.

14. The electric power generating apparatus according to claim 12,
wherein the exterior case is electrically conductive,
wherein the exterior case is electrically connected to one of the positive-electrode terminal portion and the negative-electrode terminal portion, and
wherein the exterior case has an area exposed to the outside, the area being entirely covered with an insulating member.

15. The electric power generating apparatus according to claim 12,
wherein the exterior case is electrically conductive, and
wherein the exterior case has an area facing an inside, the area being entirely covered with an insulating member, the insulating member electrically insulating the exterior case from the positive-electrode terminal portion and the negative-electrode terminal portion.

16. The electric power generating apparatus according to claim 8, further comprising:
an exterior case that forms an exterior of the electric power generating apparatus and has electrical conductivity,
wherein the shield case and the electric circuit unit are stored in the exterior case,
wherein the exterior case has a bottomed tube shape, one end in an extending direction of which is blocked by a bottom portion and another end of which has an opening portion,
wherein one of the positive-electrode terminal portion and the negative-electrode terminal portion is exposed to an outside of the exterior case from the opening portion,
wherein another one of the positive-electrode terminal portion and the negative-electrode terminal portion is integrally formed with the bottom portion, and
wherein the exterior case has an area exposed to the outside, at least a part of which, excluding the positive-electrode terminal portion and the negative-electrode terminal portion, is covered with an insulating member.

17. The electric power generating apparatus according to claim 1,
wherein the two permanent magnets are magnetized to the same magnetic pole at portions close to each other.

18. The electric power generating apparatus according to claim 1,
wherein the cap member forms a buffer member that absorbs an impact of a collision of the permanent magnets and the casing in a longitudinal direction of the guide shaft.

* * * * *